United States Patent
Yi et al.

(10) Patent No.: US 10,817,667 B2
(45) Date of Patent: Oct. 27, 2020

(54) METHOD AND SYSTEM FOR A CHAT BOX ECO-SYSTEM IN A FEDERATED ARCHITECTURE

(71) Applicant: Rulai, Inc., Campbell, CA (US)

(72) Inventors: Xing Yi, Milpitas, CA (US); Jie Li, Cupertino, CA (US)

(73) Assignee: RULAI, INC., Campbell, CA (US)

( * ) Notice: Subject to any disclaimer, the term of this patent is extended or adjusted under 35 U.S.C. 154(b) by 0 days.

(21) Appl. No.: 16/121,107

(22) Filed: Sep. 4, 2018

(65) Prior Publication Data
US 2019/0243899 A1 Aug. 8, 2019

Related U.S. Application Data

(60) Provisional application No. 62/627,367, filed on Feb. 7, 2018.

(51) Int. Cl.
*G06F 40/30* (2020.01)
*H04L 29/08* (2006.01)
(Continued)

(52) U.S. Cl.
CPC .............. *G06F 40/30* (2020.01); *G06F 16/00* (2019.01); *G06F 40/35* (2020.01); *G06N 3/006* (2013.01);
(Continued)

(58) Field of Classification Search
CPC .... G06F 17/2785; G06N 20/00; H04L 67/104
(Continued)

(56) References Cited

U.S. PATENT DOCUMENTS

| 6,272,216 B1 | 8/2001 | Vaios |
| 6,366,300 B1 | 4/2002 | Ohara et al. |

(Continued)

FOREIGN PATENT DOCUMENTS

WO 2015006246 A1 1/2015

OTHER PUBLICATIONS

PCT Search Report and Written Opinion, PCT/IB2017/055939, dated Jan. 26. 2018.
(Continued)

*Primary Examiner* — Bharatkumar S Shah
(74) *Attorney, Agent, or Firm* — Edward C. Kwok; VLP Law Group, LLP

(57) ABSTRACT

A method and a virtual agent system services a user request from a user. The virtual agent system includes: (a) a conversational user interface receiving the user request and communicating with two or more virtual agents; and (b) a dialog manager including a natural language processing module, that directs operations of the conversational user interface, wherein the dialog manager (i) receives and analyzes the user request from the conversation user interface using the natural language processing module, (ii) causes the conversational user interface to request and to receive a response to the user request from each of the virtual agents, and (iii) integrates the received responses to the user request into an integrated response based on the natural language processing module and causes the conversational user interface to provide the integrated response to the user.

60 Claims, 8 Drawing Sheets

(51) Int. Cl.
  G06N 20/00 (2019.01)
  G06F 16/00 (2019.01)
  G06N 3/00 (2006.01)
  G06N 5/04 (2006.01)
  G06F 40/35 (2020.01)
  G06N 5/02 (2006.01)

(52) U.S. Cl.
  CPC .............. G06N 5/043 (2013.01); G06N 20/00 (2019.01); H04L 67/104 (2013.01); G06N 5/02 (2013.01)

(58) Field of Classification Search
  USPC .............................................................. 704/9
  See application file for complete search history.

(56) References Cited

U.S. PATENT DOCUMENTS

| | | | |
|---|---|---|---|
| 7,933,774 | B1 | 4/2011 | Begeja et al. |
| 9,338,223 | B2* | 5/2016 | Threefoot ............... H04L 67/10 |
| 2008/0016505 | A1 | 1/2008 | Bucklew et al. |
| 2008/0313571 | A1 | 12/2008 | Bushey et al. |
| 2012/0265528 | A1 | 10/2012 | Gruber et al. |
| 2014/0074483 | A1 | 3/2014 | van Os |
| 2014/0164953 | A1 | 6/2014 | Lynch et al. |
| 2014/0297268 | A1 | 10/2014 | Govrin et al. |
| 2015/0032443 | A1 | 1/2015 | Karov et al. |
| 2015/0185996 | A1 | 7/2015 | Brown et al. |
| 2015/0186155 | A1 | 7/2015 | Brown et al. |
| 2015/0186156 | A1* | 7/2015 | Brown .................... G06F 9/453 715/706 |
| 2015/0213140 | A1 | 7/2015 | Volkert |
| 2015/0332670 | A1 | 11/2015 | Akbacak et al. |
| 2016/0110422 | A1 | 4/2016 | Roytman et al. |
| 2016/0179787 | A1 | 6/2016 | Deleeuw |
| 2016/0212488 | A1 | 7/2016 | Os et al. |
| 2017/0017635 | A1 | 1/2017 | Leliwa et al. |
| 2017/0324868 | A1 | 11/2017 | Tamblyn et al. |
| 2017/0344889 | A1* | 11/2017 | Sengupta ................ H04L 67/22 |
| 2018/0218374 | A1* | 8/2018 | Shah .................... G06Q 30/016 |
| 2018/0285595 | A1* | 10/2018 | Jessen .................... H04L 67/14 |

OTHER PUBLICATIONS

PCT Search Report and Written Opinion, PCT/US2018/032753, dated Jul. 30, 2018.
Shokouhi et al, "Federated Search," Foundations and Trends in Information Retrieval, vol. 5, No. 1 (2011) 1-102.

* cited by examiner

METHOD AND SYSTEM FOR A CHAT BOX ECO-SYSTEM IN A FEDERATED ARCHITECTURE

CROSS REFERENCE TO RELATED APPLICATION

This application relates to and claims priority of U.S. provisional Application ("Provisional Application"), Ser. No. 62/637,367, entitled "Method and System for Chatbox Eco System in a Federated Architecture," which was filed Feb. 8, 2018. This Application is also related to (i) U.S. patent application ("Copending Application I"), Ser. No. 15/677,319, entitled "Method and System for Semi-Supervised Learning in generating Knowledge for Intelligent Virtual Agents," filed on Aug. 15, 2017 and published as U.S. Patent Application Publication 2018/0053119 A1; and (ii) U.S. patent application ("Copending Application II"), Ser. No. 15/677,275, entitled "Method and System for Collaborative Intelligent Virtual Agents," filed on Aug. 15, 2017 and published as U.S. Patent Application Publication 2018/0054464 A1.

The Provisional Application and Copending Applications I and II are hereby expressly incorporated by reference in their entireties.

BACKGROUND OF THE INVENTION

1. Technical Field

The present teaching generally relates to online services. More specifically, the present teaching relates to methods, systems, and programming for virtual agents.

2. Discussion of the Related Art

With the new wave of artificial intelligence (AI), some research effort has been directed to conversational information systems. Intelligent assistants with a conversational user interface, or so-called intelligent chat robots ("chat bots"), have emerged in recent years. Examples include Siri® of Apple, Facebook Messenger, Amazon Echo, and Google Assistant.

Conventional chat bot systems require many hand-crafted rules and manually labeled training data for the systems to learn the communication rules for each specific domain. This led to expensive human-labeling efforts and, hence, high costs. Furthermore, even for humans, knowledge in each specific domain are often incomplete, not well-understood or not well-characterized, such that chat bots created under different sets of hand-crafted rules and training data may excel in performance under different circumstances, but with none exceling under all instances.

Therefore, as many chat bots serving a specific domain may be commercially or otherwise available, it would be potentially advantageous to derive from their outputs the best response for a given set of circumstances.

SUMMARY

According to one embodiment of the present invention, a virtual agent system servicing a user request from a user, includes (a) a conversational user interface receiving the user request and communicating with two or more virtual agents; and (b) a dialog manager including a natural language processing module, that directs operations of the conversational user interface, wherein the dialog manager (i) receives and analyzes the user request from the conversation user interface using the natural language processing module, (ii) causes the conversational user interface to request and to receive a response to the user request from each of the virtual agents, and (iii) integrates the received responses to the user request into an integrated response based on the natural language processing module and causes the conversational user interface to provide the integrated response to the user.

According to one embodiment of the present invention, in a virtual agent system servicing a user request from a user, a method includes: (a) in a conversational user interface, receiving the user request and communicating with two or more virtual agents; and (b) in a dialog manager that includes a natural language processing module and that directs operations of the conversational user interface, (i) receiving and analyzing the user request from the conversation user interface using the natural language processing module, (ii) causing the conversational user interface to request and to receive a response to the user request from each of the virtual agents, and (iii) integrating the received responses to the user request into an integrated response based on the natural language processing module and causes the conversational user interface to provide the integrated response to the user.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION OF THE PREFERRED EMBODIMENTS

Figure 1:
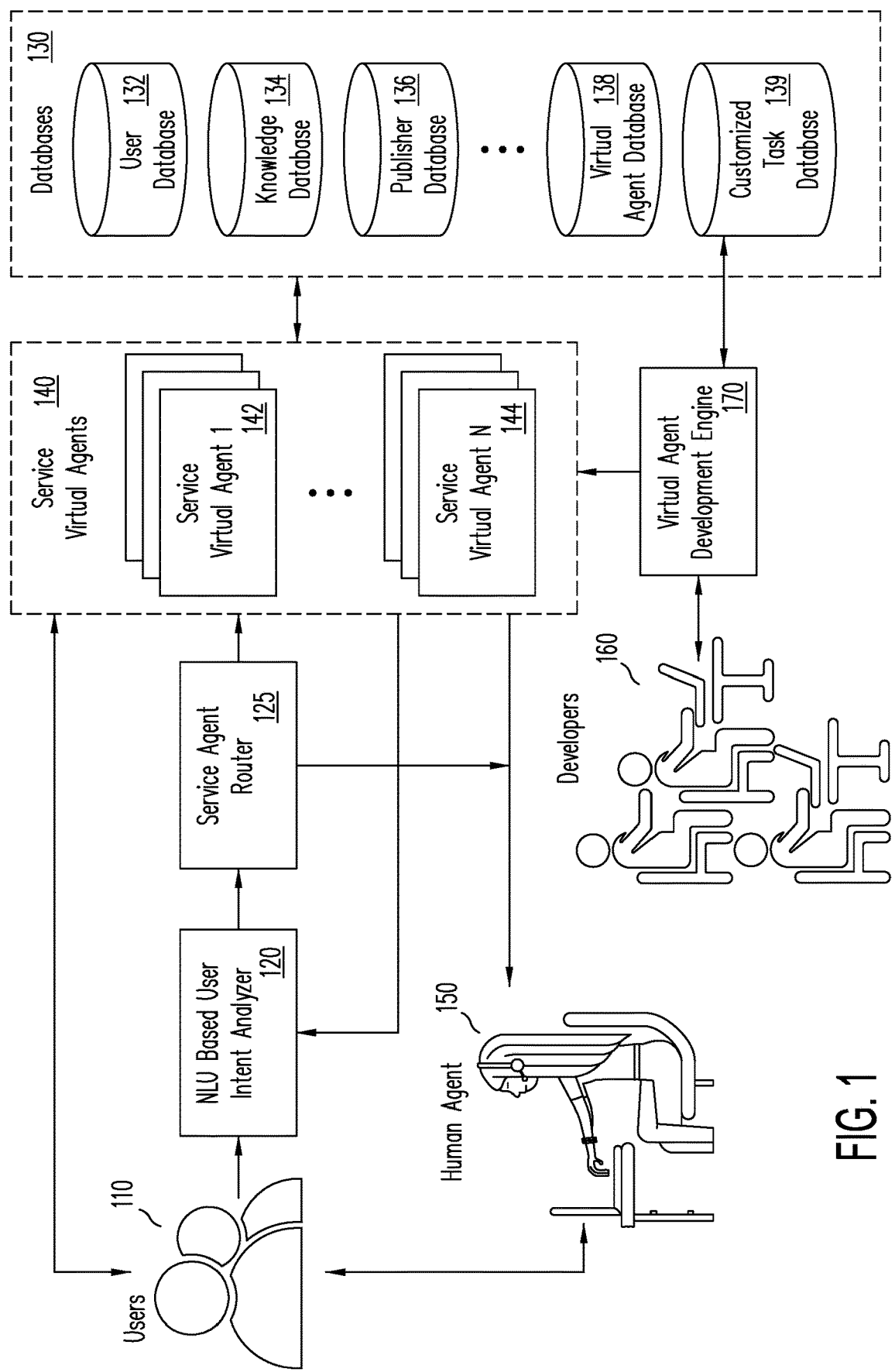
FIG. 1 depicts a generalized framework for service agent development and application.

To facilitate cross-referencing among the figures and to simplify the detailed description below, like elements in the figures are assigned like reference numerals to the extent practicable.

In the following detailed description, details are set forth by way of examples to provide a thorough understanding of the relevant teachings. However, the present teachings may be practiced without such details. In other instances, well-known methods, procedures, components, or circuitry have been described at a relatively high-level, without detail, in order to avoid unnecessarily obscuring aspects of the present teachings.

The present disclosure generally relates to systems, methods, medium, and other implementations directed to various aspects of technologies associated with technologies used in artificial intelligence-based human-machine interactions. In some embodiments, unsupervised, semi-supervised and fully supervised approaches are disclosed for learning from past and present conversations so as to efficiently and effectively derive different types of dialog models, including Frequently-Asked-Questions ("FAQ") models and task-based conversation models. In a different embodiment, to handle dynamically changing contexts in human-machine conversations, the present teaching also discloses means to automatically selecting and switching resources, adaptive to the dynamic conversation contexts, thereby appropriately supporting the changing dialogs. The adaptive selection and switching resources may include switching from one set of service agents to another set of service agents based on dynamically developed conversation situations, whether from one or more virtual agents to a different set of virtual agents or to a human agent. In some of the embodiments, the virtual agents available to a given virtual agent development and application system may include virtual agents that are internal, external, or both, to that given system.

In other embodiments, the present teaching discloses developing, training, and deploying a system having multiple effective intelligent virtual agents, whether internal or external, that are involved simultaneously. In different embodiments, the present teaching discloses a virtual agent that can carry on a dialog with a user, based on knowledge taught from a bot design programming interface, while interacting with multiple virtual agents that provide the user's requested service. The disclosed system in the present teaching can integrate the output responses of various intelligent virtual agents to generate high-quality automatic responses that can be used to assist a human representative or agent, to accomplish complex service tasks, or to address a user's information need in an efficient way. More specifically, based on machine learning and AI technique, the disclosed system can learn how to strategically select or integrate output responses from multiple virtual agents to provide a response to a user's request, optimized for the current set of circumstances. The disclosed system can also learn, build or adapt its ability to handle future user demands based on the knowledge base and historical conversations to better select or integrate of virtual agent responses in future conversations, using both supervised and unsupervised machine learning or training techniques.

The terms "service virtual agent", "virtual agent", "conversational agent", "agent", "bot" and "chat bot" may be used interchangeably herein. Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 depicts a generalized framework of the development and applications of service virtual agents. In this example, the disclosed system may include a natural language understanding-based ("NLU-based") user intent analyzer 120, service agent router 125, N service virtual agents 140, databases 130, and virtual agent development engine 170.

Service virtual agents 140 in FIG. 1 may perform direct dialogs with the users 110. Each virtual agent may focus on a specific service or domain when chatting with one or more users. For example, a user may send utterances to NLU-based user intent analyzer 120. Upon receiving an utterance from a user, NLU-based user intent analyzer 120 may analyze the user's intent based on an NLU model and the utterance. In one embodiment, the NLU based user intent analyzer 120 may utilize machine learning technique to train the NLU model based on real and simulated user-agent conversations as well as contextual information of the conversations. NLU-based user intent analyzer 120 may estimate the user intent and send the estimated user intent to service agent router 125 for agent routing.

Service agent router 125 in this example may receive the estimated user intent from NLU-based user intent analyzer 120 and may select one of service virtual agents 140, based on the estimated user intent. Service virtual agents 140 may include, for example, a virtual customer service agent, a virtual sales agent, a virtual travel agent, a virtual financial advisor, and a virtual sport commenter. Once service agent router 125 determines that a service virtual agent has a domain or service matching the estimated user intent, service agent router 125 can route the user's utterance to the corresponding virtual agent to enable a conversation between the virtual agent and the user.

During the conversation between the virtual agent and the user, the virtual agent can analyze and determine dialog states based on the dialog and manage real-time tasks related to the dialog, based on data stored in various databases (e.g. knowledge database 134, a publisher database 136, and a customized task database 139). The virtual agent may also perform product or service recommendation to the user based on user database 132. In one embodiment, when the virtual agent determines a change in the user's intent or the user is dissatisfied with the current dialog, the virtual agent may redirect the user to a different agent based on virtual agent database 138. The different agent may be a different virtual agent or human agent 150. For example, when the virtual agent detects that the user is asking for a sale related to a large quantity or a large amount of money (e.g. higher than a predetermined threshold), the virtual agent can escalate the conversation to human agent 150, such that human agent 150 can take over the conversation with the user. The escalation may be seamless and not causing any delay to the user.

Virtual agent development engine 170 in this example provides a bot design programming interface through which a developer may develop a customized virtual agent. In fact, virtual agent development engine 170 can work with multiple developers 160 at the same time, with each developer developing separately a customized virtual agent with a specific service or domain. As such, a service virtual agent (e.g. the service virtual agent 142) may have different versions as shown in FIG. 1, each of which corresponds to a customized version generated based on a developer's specific request or specific parameter values. Virtual agent development engine 170 may also store the customized tasks into customized task database 139, which can provide previously generated tasks as a template for future task generation or customization during virtual agent development.

Figure 2:
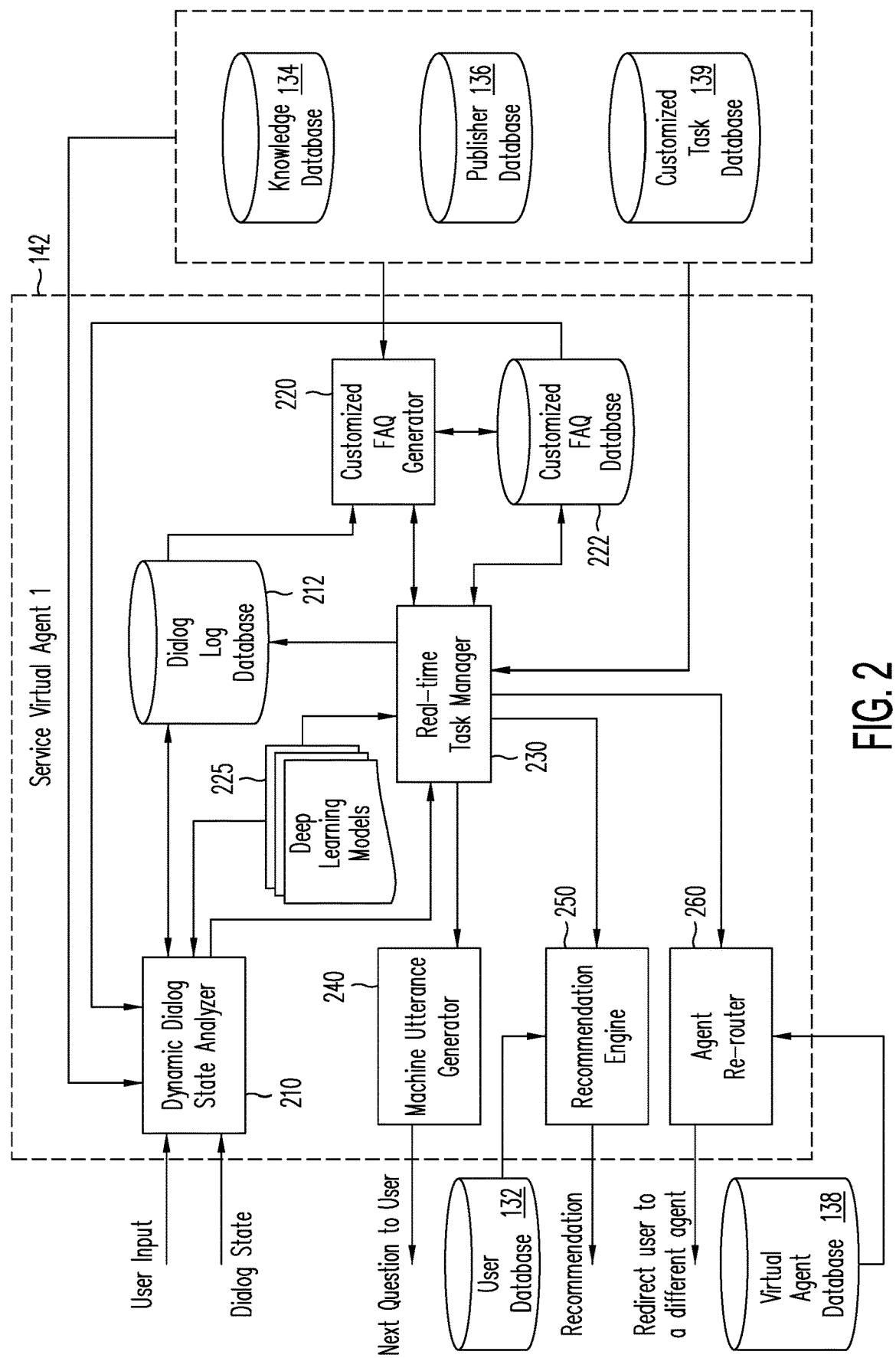
FIG. 2 depicts an exemplary high-level system diagram of service virtual agent 142 of FIG. 1.

FIG. 2 depicts an exemplary high-level system diagram of virtual agent 142 of FIG. 1. Virtual agent 142 in this example includes dynamic dialog state analyzer 210, dialog log database 212, one or more deep learning models 225, customized FAQ generator 220, customized FAQ database 222, various databased (e.g., knowledge database 134, publisher database 136, ..., and customized task database 139), real-time task manager 230, machine utterance generator 240, recommendation engine 250, and agent re-router 260.

Although FIGS. 1 and 2 provide as examples such databases as customized FAQ database 222, knowledge database 134, publisher database 136, and customized task database 139, other databases can be made available for developing virtual agents of specific domains or applications. Such other databases may be, for example, customer business process databases and customer relationship modules (CRMs), for virtual agents of various business applications. Also, customized skill or intent database may be provided for downstream virtual assistant modules, such as Amazon Alexa skills or Microsoft LUIS customized intents. For virtual agents associated with document depository or servers, a database holding a customer's enterprise document information (e.g. internal or enterprise website pages, enterprise presentation documents, slides and WORD documents) may be provided. In general, to support virtual agents for domain knowledge-specific applications, customized domain-specific databases are provided (e.g. drug stock and price databases).

In operation, dynamic dialog state analyzer 210 continuously receives and analyzes input utterances and data from user 110 and determines the resulting dialog state based on that dialog with user 110. The analysis of the user's input utterances may be achieved via natural language processing (NLP), which can be a key component of dynamic dialog state analyzer 210. Different NLP techniques may be employed to analyze the input utterances from a user. The determination of a dialog state can be based on, for example, deep learning models 225, and optionally some known customer-related FAQs from customized FAQ database 222.

Dynamic dialog state analyzer 210 record dialog logs, including both the dialog states and other metadata related to the dialog, into dialog log database 212, which can be used by customized FAQ generator 220 for further generating customized FAQs. Dynamic dialog state analyzer 210 may also estimate user intent based on the dialog states determined by analyzing the received user input. The estimated user intent is then sent to real-time task manager 230 for real-time task management.

As discussed herein, dynamic dialog state analyzer 210 may analyze the user input based on customized FAQ data obtained from customized FAQ database 222 generated by customized FAQ generator 220. Customized FAQ generator 220 in this example may generate FAQ data customized for the domain associated with virtual agent 142, or customized based on a customers' specific requirements. For example, when virtual agent 142 is a virtual sales agent, the customized FAQ generator 220 may generate FAQs relevant to sales. Examples of FAQs customized for a sale agent include: What products are you selling? What is the price list for the products being sold? How can I pay for a product? How much is the shipping fee? How long will be the shipping time? Is there any local store? The customized FAQ generator 220 may generate these customized FAQs based on information from different sources such as knowledge database 134, publisher database 136, customized task database 139, and any of the domain knowledge-specific databases.

Information from different sources may provide knowledge of different perspectives for a virtual agent to utilize. For example, knowledge database 134 may provide information about general knowledge related to products and services. Publisher database 136 may provide information about each publisher (e.g., products or services the publisher is selling for which companies, what advertisements of which products or services the publisher is displaying, or which virtual agent the publisher has deployed to provide services). Customized task database 139 may store data related to customized tasks generated according to some customers' specific requests. For example, if virtual agent 142 is a customized version of a virtual car sales agent developed based on a specific request for a location having a specific climate (e g , many snow storms), the customized tasks database generated by customized FAQ generator 220 may include FAQs customized specifically for that type of climate, e.g.: Do you like to add snow tires on your car? Which cars have all-wheel-drive functions? The answers to such questions may also be generated by customized FAQ generator 222 based on, e.g., the information from knowledge database 134. Such generated customized questions or answers may be stored in customized FAQ database 222, which can then be retrieved by dynamic dialog state analyzer 210 for understanding the user input or by real-time task manager 230 for determining how to handle the questions from the user.

The questions and answers stored in customized FAQ database 222 may also be used, by customized FAQ generator 220 to generate more customized FAQs. For example, question "Which cars have all-wheel-drive functions?" may be asked in different ways, including "Do you have any car with all-wheel-drive function," "How many cars do you have that have all-wheel-drive function?" Variations of a known question may be a basis for generating additional customized FAQ questions. The same can be applied to generating answers to different questions. In this way, the virtual agent automatically and adaptively continues to enhance its ability to handle more diversified questions.

Customized FAQ generator 220 may also generate customized FAQs based on data obtained from the dialog log database 212. For example, based on logs of previous dialogs between virtual agent 142 and various users, customized FAQ generator 220 may identify which question is asked very frequently and which question is asked infrequently. Based the frequencies of the questions asked in the logs, the customized FAQ generator 220 may generate or update FAQs accordingly in customized FAQ database 222. Customized FAQ generator 220 may also send the customized FAQ data to real-time task manager 230 for determining next task type.

The disclosed system may also include an offline conversation data analysis component, which can mine important statistical information and features from historical conversation logs, human action logs and system logs. The offline conversation data analysis component, not shown, may be either within or outside virtual agent 142. The important statistical information and signals (e.g. the frequency of each types of question and answer, and the frequency of humanedits for each question, etc.) can be used by other system components (such as customized FAQ generator 220 for identifying important new FAQs, and the recommendation engine 250 for performing high-quality recommendations for products and services,) for their addressed specific tasks for the disclosed system.

Real-time task manager 230 in this example may receive estimated user intent and dialog state data from the dynamic dialog state analyzer 210, customized FAQ data from either the customized FAQ database 222 or directly from the customized FAQ generator 220, and/or information from the customized task database 139. Based on the dialog state, the FAQ data, the real-time task manager 230 may determine a next task for virtual agent 142 to perform. Such decisions may be made based also on information or knowledge from the customized task database 139. For example, if an underlying task is to assist a chat user to find weather information of a locale, the knowledge from customized task database 139 for this particular task may indicate that the virtual agent or bot for this task needs to collect information about the locale (city), date, or even time in order to proceed to get appropriate weather information. Similarly, if the underlying task is for assisting a chat user to get a rental car, the knowledge or information stored in the customized task database 139 may provide guidance as to what information a virtual agent or bot needs to collect accordingly from the chat user. For example, for the task of identifying a rental car for a user, the information that needs to be collected may involve pick-up location, drop-off location, date, time, name of the user, driver license (optional), type of car desired, price range, etc. Such information may be fed to the real-time task manager 230 to determine what questions to ask a chat user.

A next action can be an action or a different task, selected from multiple types of actions or tasks. For example, an action may be to continue to solicit additional input from the user (in order to narrow down the specific interest of the user) by asking appropriate questions. Alternatively, an action may also be to proceed to identify an appropriate product to be recommended to the user, e.g., when it is decided that the user input at that point is adequate to ascertain the intent. The next action may also be to proceed to a different task. For instance, during a session of conversation related to booking a flight, a user may ask to book a hotel room in the destination city. In this case, the next action is to proceed to a different task (which may be handled by a different agent, whether human or virtual agent) to take care of the user's need for making a reservation of a hotel room.

Furthermore, real-time task manager 230 may be operating in a space that includes both a machine action sub-space and a human action sub-space. In the machine action sub-space, tasks/actions are handled by virtual agents. In the human action sub-space, actions/tasks are handled by human agents. The actions or tasks related to a dialog session may be channeled within the same sub-space or across the two sub-spaces. For instance, a virtual agent in the machine sub-space may invoke another virtual agent in the same machine sub-space, determined based on, e.g., the context of the dialog, the detected user intent, and/or the specialty of other virtual agents. As another example, an action taken by a virtual agent in the machine sub-space may be to re-route to a human agent in the human sub-space and vice versa. The channeling between the two sub-spaces may be controlled based on models established via machine learning. According to the present teaching, the real-time task manager 230 may determine which action to take based on deep learning models 225 and data obtained from knowledge database 134, publisher database 136, customized task database 139, any customer business process databases, CRMs, customized skill or intent databases, any customer's enterprise document information databases and any customized domain-specific databases.

Real-time task manager 230 decides to continue the conversation with the user to gather additional information, the real-time task manager 230 also determines the appropriate next question to ask the user. Then the real-time task manager 230 may send the question to the machine utterance generator 240 for generating machine utterances corresponding to the question. The machine utterance generator 240 may generate machine utterances corresponding to the question to be presented to the user and then present the machine utterances to the user. The generation of the machine utterances may be based on textual information or oral using, e.g., text to speech technology.

When real-time task manager 230 determines that there has been adequate amount of information gathered to identify an appropriate product or service for the user, real-time task manager 230 may then proceed to invoke the recommendation engine 250 for searching an appropriate product or service to be recommended. Recommendation engine 250, when invoked, searches for product appropriate for the user based on the conversation with the user. In searching for a recommended product, in addition to the user intent estimated during the conversation, recommendation engine 250 may also further individualize the recommendation by accessing the user's profile from user database 132. In this manner, recommendation engine 250 may individualize the recommendation based on both user's known interest (from user database 132) and the user's dynamic interest (from the conversation). The search may yield numerous products and such searched product may be ranked based on a machine learning model.

When real-time task manager 230 determines that the conversation with the user involves a price that is higher than a threshold, or that the user has a new intent associated with a domain requiring expertise other than that of virtual agent 142, or that the user is detected in a dissatisfaction mood, the real-time task manager 230 may then invoke the agent re-router 260 for re-routing the user to a different agent. Agent re-router 260, when invoked, may re-route the user to a different agent. Depending on the context of the conversation, the re-routing agent is selected. For example, the agent re-router 260 may route the user to a different service virtual agent, when it is detected that what the user needs requires expertise of the different service virtual agent.

In a different situation, agent re-router 260 may re-route the user to the human agent 150, when, e.g., the conversation with the user indicates a situation that requires human agent involvement. Such a situation may be pre-defined or dynamically detected. For example, if the conversation leads to an intended transaction that involves a sum of money higher than a threshold, the further handling may be re-routed to a human agent. As another example, during the conversation, it may be detected (dynamically) that the user is dissatisfied with virtual agent 142. In this case, virtual agent 142 may re-route the user to a human agent. Similarly, if at any time, virtual agent 142 is incapable of gathering needed information (e.g., stuck in a situation in which either the user is not providing the needed information or whatever the user provided is not comprehensible by the service virtual agent) to advance the conversation, the user may also be re-routed to a human agent. In yet another case, agent re-router 260 may re-direct the user's conversation to NLU based user intent analyzer 120 to perform the NLU based user intent analysis again and to re-route the user to a corresponding virtual agent, when e.g. virtual agent 142 detects that the user has a new intent associated with a different domain than that of virtual agent 142 but cannot determine which virtual agent corresponds to the same domain as the new intent.

However, the system of FIGS. 1 and 2 correspond to a closed system that does not provide for allowing the user to interact with a service agent that is outside of the system (e.g., a service agent that is not developed by virtual agent development engine 170). Such a closed system would not be able to take advantage of third-party developed virtual agents.

Figure 3A:
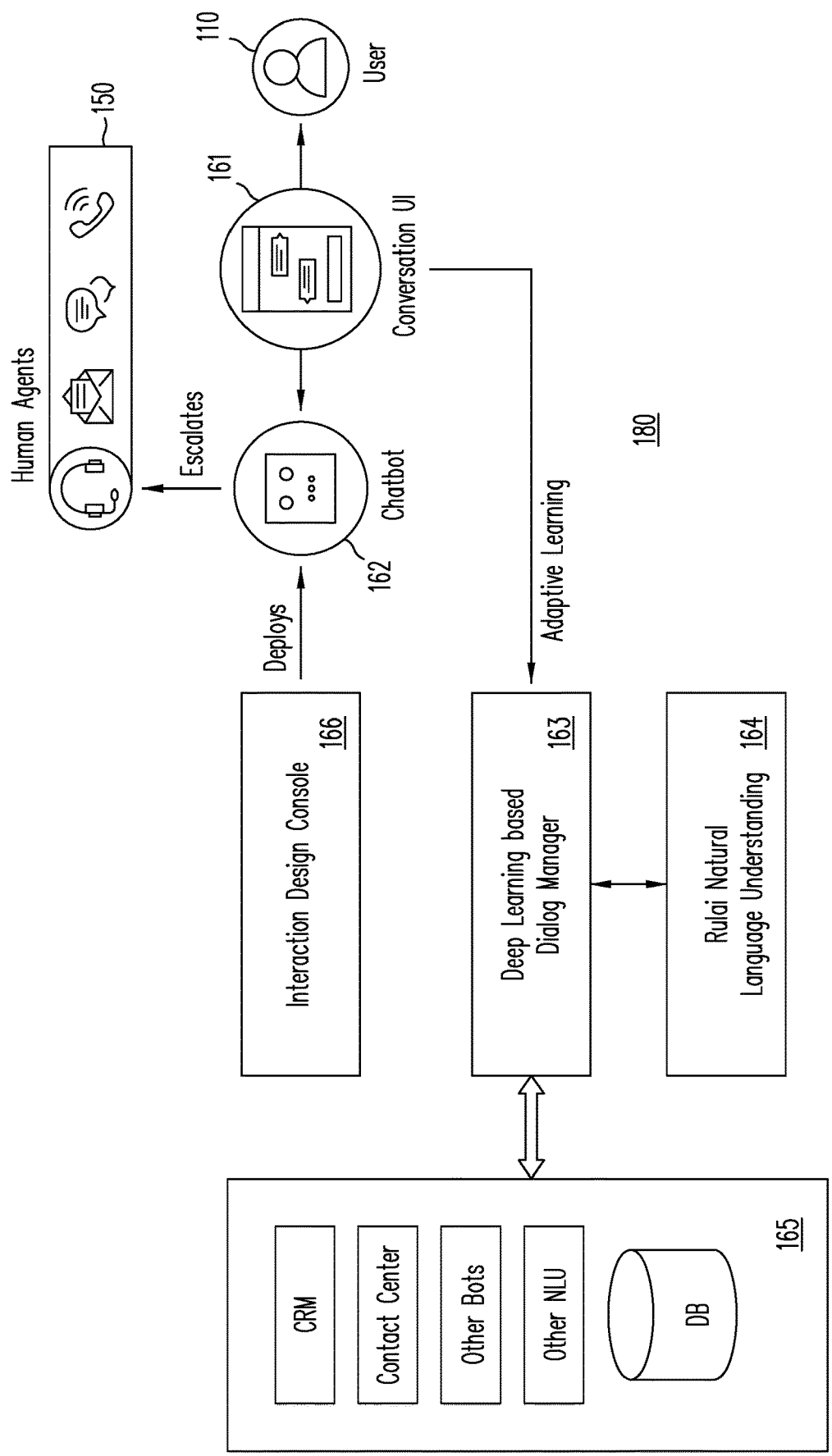
FIG. 3A shows system 180, which allows the user to interact with one or more external virtual agents, in accordance with one embodiment of the present invention.

FIG. 3A shows system 180, which allows the user to interact with one or more external virtual agents, in accordance with one embodiment of the present invention. As shown in FIG. 3A, system 180 includes conversational user interface 161 which interacts with both chatbot 162 and user or users 110. Chatbot 162 may be any of service agents 140 of FIG. 1 or an external service agent. Conversational user interface 161 with chatbot 162 or user 110 (or both) may be fed back to deep learning-based dialog manager 163 to allow adaptive learning in deep learning models in deep learning-based dialog manager 163 to improve subsequent interactions with user 110. Deep learning-based dialog manager 163 draws upon natural language module 164 to handle processing of natural language utterances from user 110 or for generating natural language utterances for interacting with user 110. In addition, adaptive learning input from conversational user interface 161 trains deep learning models in deep learning-based dialog manager 163 also draw upon system resources 165 in its operation and training. System resources 165 may include, for example, various databases (e.g., databases 130 of FIG. 1), other service agents or robots ("bots"), other natural language modules, customer relationship modules ("CRMs") and contact centers for additional assistance. Chatbot 161 may be developed by interaction design console 166, which may be implemented, for example, by virtual agent development engine 170 of FIG. 1. As in any of the virtual agents of FIG. 1, the deep learning models in deep-learning models in deep learning-based dialog manager 163 may cause chatbot 162 to escalate any appropriate cases to human agent 150.

System 180 may be implemented, for example, as an extension to the system of FIG. 1. In that regard, conversational user interface 161, deep learning-based dialog manager 163 and natural language 164 may be part of NLU-based user intent analyzer 120 and service agent router 125 of FIG. 1, and system resources 165 may include service agents 140 and databases 130 of FIG. 1. As an external virtual agent may not include agent-specific dialog components, such as dynamic dialog analyzer 210, dialog database 212, customized FAQ generator 220, customized FAQ database 222, and machine utterance generator 240, these dialog components may be incorporated for each external virtual agent into deep-learning dialog manager 163. Deep learning models 225 of FIG. 2 are illustrative of deep learning models in deep-learning-based dialog manager 163.

Figure 3B:
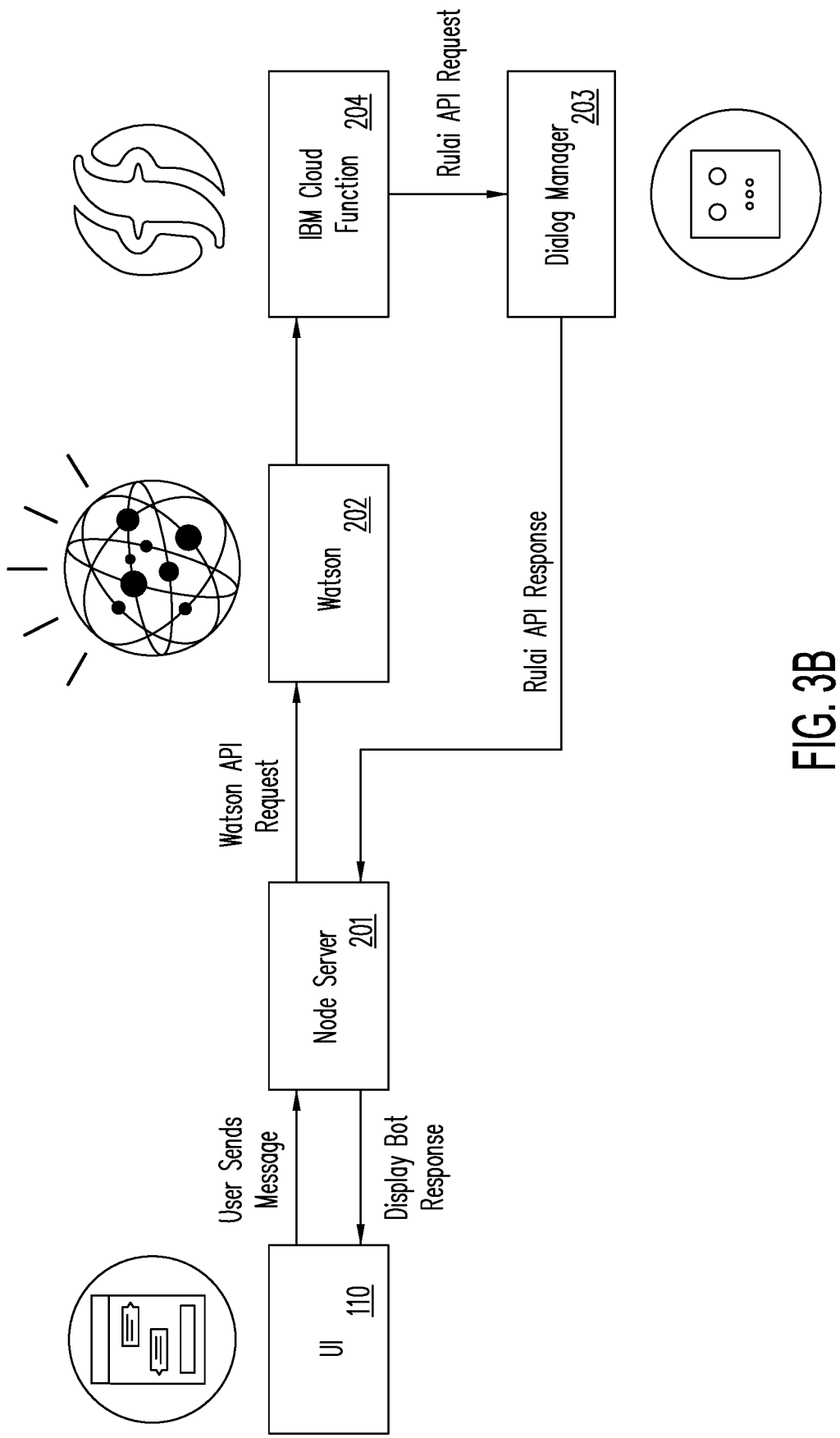
FIGS. 3B and 3C are examples of integrating an external virtual agent in system 160.
Figure 3C:
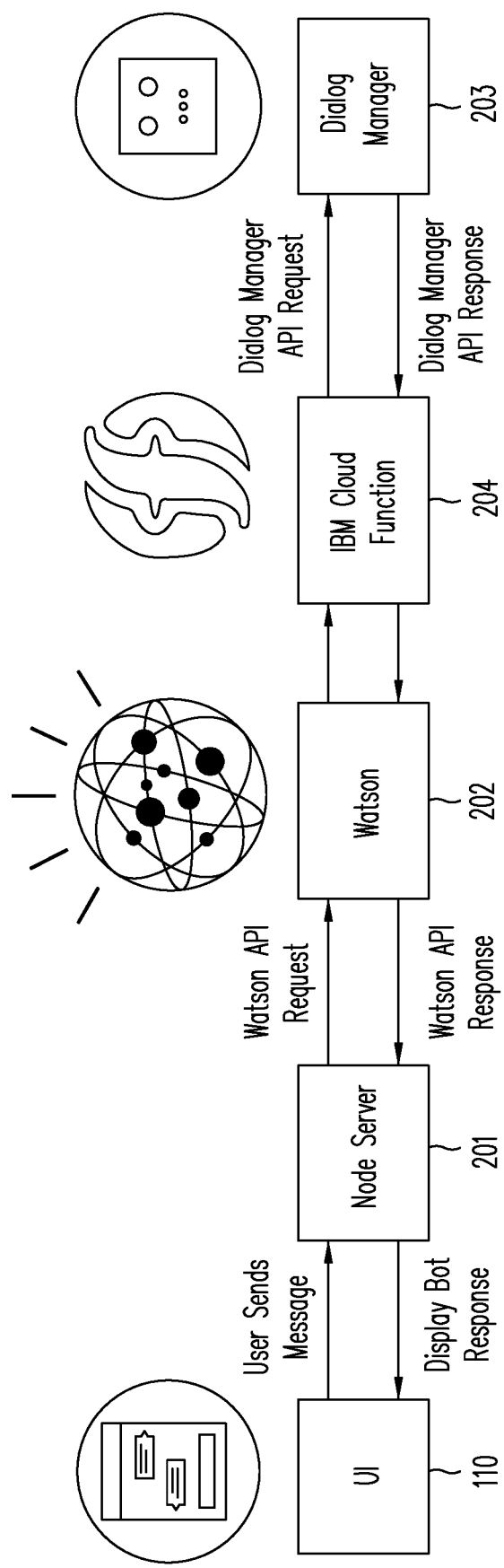
Figure 4A:
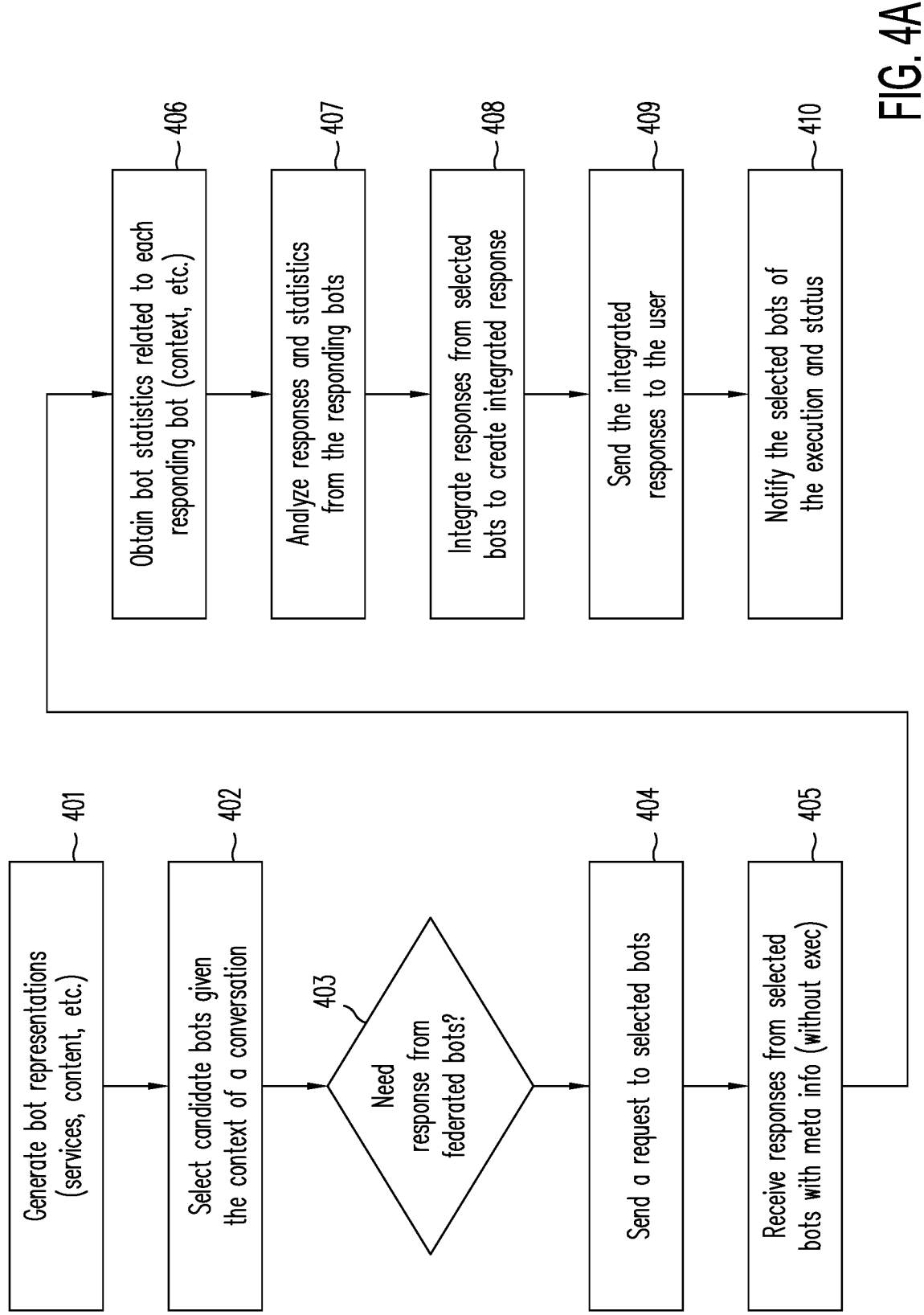
FIG. 4A is a flow chart illustrating the operations of a system using federated conversational agents.
Figure 4B:
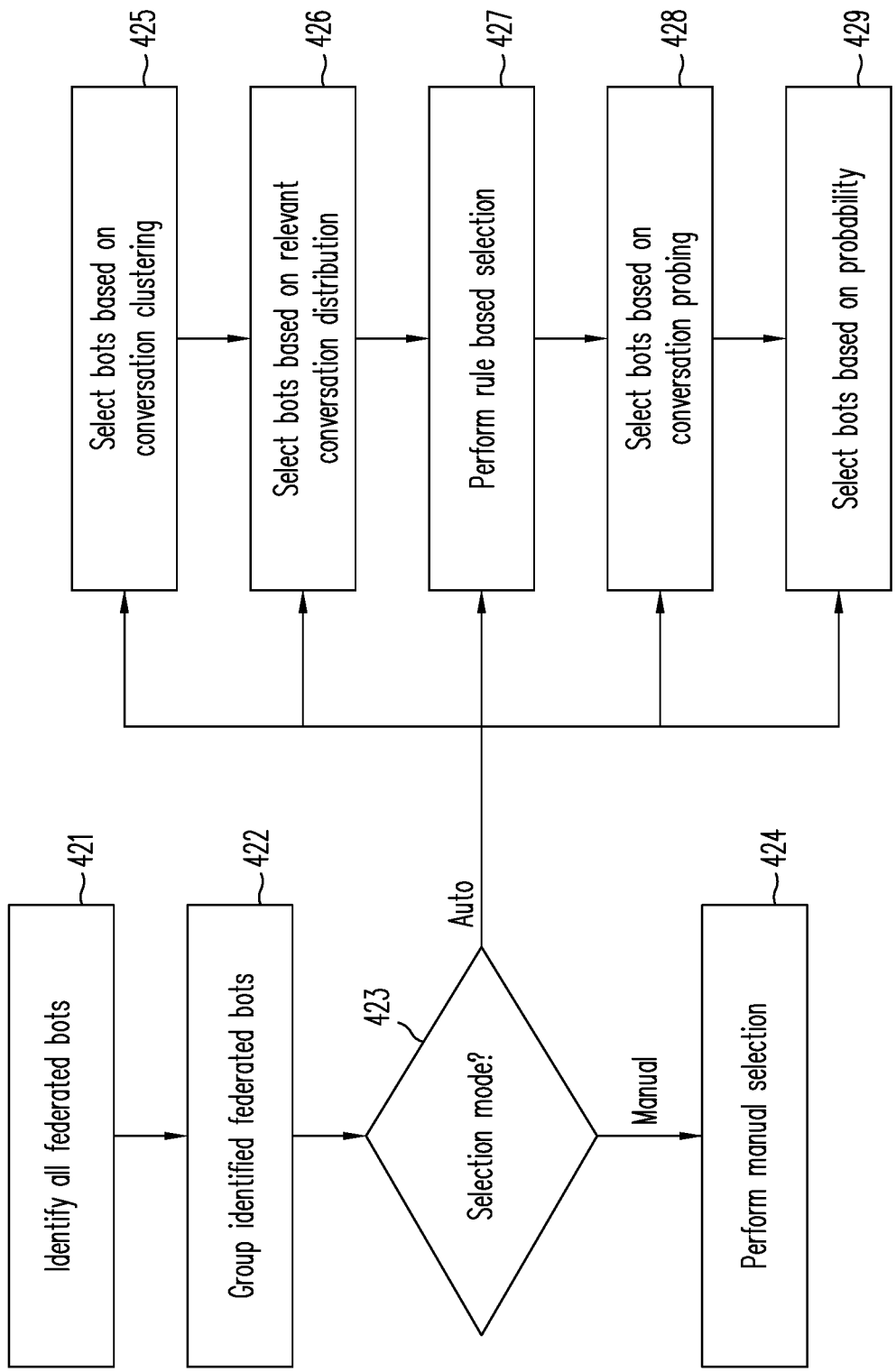
FIG. 4B is a flow chart further illustrating virtual agent selection under step 402 of FIG. 4A.

The operations of deep learning-based dialog manager 163 may be illustrated in part, for example, by the dynamic dialog state analyzer of Copending Application I (see, e.g., FIGS. 4A-4B and the accompanying detailed description in Copending Application I). The deep-learning models may be trained user a semi-supervised machine learning paradigm, such as illustrated in Copending Application I (see, e.g., FIGS. 3A-3F and the accompanying detailed description in Copending Application I). FIG. 4B is a flowchart of an exemplary process for a dynamic dialog state analyzer in a service virtual agent, according to an embodiment of the present teaching;

As mentioned above, system 180 allows providing an external virtual agent—as chatbot 162—to service user 110. FIGS. 3B and 3C are examples of integrating an external virtual agent in system 160. As shown in FIG. 3B, node server 201 serves as a user interface with user 110, receiving user requests from user 110 and providing utterances and graphical display output to user 110. The user interface of node server 201 may be driven, for example, by dialog manager 203, which may be implemented, for example, by deep learning-based dialog manager 163 of FIG. 3A. Node server 201 provides each received user requests to external virtual agent 202 (e.g., an expert system, such as the IBM "Watson"). The response from external virtual agent 202 may be routed through private data network 204 (e.g., "IBM Cloud"), for example, to dialog manager 203. The interface with external virtual agent 202 may be provided, for example, through an application programming interface (API).

FIG. 3C shows an alternative exemplary configuration for integrating an external virtual agent into system 180. As shown in FIG. 3C, unlike the configuration of FIG. 3B, dialog manager 203 does not directly control node server 201. Instead, responses from dialog manager 203 to the user is provided to external virtual agent 202 through private data network 204 to external virtual agent 202. External virtual agent 202 then forward the response from dialog manager 203, with or without formatting, to node server 201 to be provided to user 110. In this configuration, external virtual agent 202 provides an API for dialog manager 203 to send its response. As shown in FIG. 3C, node server 201 interacts with external virtual agent 202 also over API interfaces.

Although only a single virtual agent is illustrated in each of the configurations of FIGS. 1-2 and 3A-3C, the conversational user interface (e.g., conversation user interface 161 of FIG. 3A or node server 201 in each of FIGS. 3B-3C) of the present invention can handle multiple virtual agents simultaneously. These virtual agents may work together in a "federated bot eco-system," i.e., the virtual agents may cooperate to respond to a user request. In that regard, the virtual agent and the conversational user interface may be tightly-coupled ("cooperative") or loosely-coupled ("non-cooperative"). The cooperative virtual agent (e.g., illustrated by the configurations of FIGS. 1 and 2) conforms to a standardized protocol which specifies that the virtual agent publishes its content, its conversation format, and result statistics that characterizes its performance relative to a specified benchmark. In contrast, a non-cooperative virtual agent, typically one that is engaged as an external virtual agent (e.g., the configurations of FIGS. 3B-3C) may provide as little as a request-response interface, such as a set of APIs.

In a federated bot eco-system, the virtual agents to serve a given user may be selected using any one of the operational modes: (a) a browsing model, in which the virtual agents are selected by the user (e.g., selecting from a menu); (b) a directory model, in which the system select from predetermined sets of virtual agents ("federated conversational agents"), based on the context of an on-going conversation with the user; (c) a message-passing model, in which a user request is sent out to virtual agents in the network and the agents' responses are then gathered and processed to provide the response to the user. The message-passing model operates well in a network in which communication among the agents occur in a "peer-to-peer" manner.

Thus, the message-passing model is also referred to as the "peer-to-peer conversational agents."

The operations of a system using federated conversational agents are illustrated by the flow of FIG. 4A. At step 401, the system generates a profile for each virtual agent (i.e., information or description regarding the content and services provided by the virtual agent). For a given conversation, the virtual agents may be selected from the recognized context of the conversation (step 402). Generally, the profiles of the candidate virtual agents to be recruited are evaluated and ranked. Based on this ranking, a subset of virtual agents may be selected. The evaluation may be based, for example, on applying a predetermined set of metrics on the recognized context. The metrics may focus on both sensitivity and relevance ("recall-oriented").

After completing the virtual agent selection, if desired, an initial request may be sent to the selected virtual agents (step 404). The format and sophistication of information in the initial request sent to each virtual may depend on the interoperability and cooperativeness with the conversational user interface. Typically, each selected virtual agent is expected to return a potential response, together with meta-information regarding the response (e.g., an explanation), if available (step 405). No real-time task is undertaken by the virtual agents at this juncture. From these responses, the conversational user interface generates an integrated response to be sent to the user, using underlying statistics learned from experience with the selected virtual agents (step 406-409). Such statistics may relate, for example, to inverse document frequencies ("idfs"), stop lists, historical requests, and context. These statistics are generally based on relevance and correctness (i.e., "precision-oriented"). The virtual agents whose responses are incorporated in some extent or form are notified and provided with relevant parameter values. The conversational user interface also updates its relevant status information (step 410).

In one embodiment, in addition to sending the user request to the federated conversational agents, the user request may be also be sent to query a sample request database, which includes sample responses previous prepared or previously learned. The integrated response to the user incorporates both responses from the federated conversational agents, as well as from the sample response database. Machine learning techniques may be applied to both the federated conversational agents and the sample request database to improve their respective performances.

Virtual agent selection under step 402 of FIG. 4A may be further illustrated by the flow chart of FIG. 4B. At step 421, all virtual agents that can be included as federal conversational agents are identified. These agents may be then grouped according to specific criteria (step 422). The grouping criteria may be applied automatically (steps 425-429), or manually (step 424). Automatic grouping criteria include (i) conversation clustering (step 425); (ii) relevant conversation. distribution (step 426); (iii) rule-based selection (step 427); (iv) conversation probing (step 428); and (v) statistical criteria. (e.g., estimates by a classifier of the probability the virtual agent can handle a given request; step 429).

In the above grouping criteria, the term "conversation clustering" refers to clustering or grouping of virtual agents based on similarities among their historical conversations (or conversation log or transcripts) with humans, so as to group virtual agents capable of handling similar human requests together for future handling of such requests.

The term "relevant conversation distribution" refers to using historical interactions between human and virtual agents—beyond merely conversations—to extract relevant signals, such as (i) user actions (e.g., purchase, download or click signals), (ii) user satisfaction signals (e.g., high ratings reported for conversation or session experiences), (iii) domain-relevant information (e.g., relations associated with semantic meanings), which allow grouping of virtual agents to better satisfy user requests in specific domains (e.g. best-rated car-seller virtual agents, or 3-star rated flight-booking virtual agents).

The term "conversation probing" refers to a strategy most applicable for dealing with non-cooperative agents. In conversation probing, the dialog manager uses historical user utterances or machine-generated or simulated user utterances[1] to quest or probe a group of virtual agents. Based on the similarity of their responses and a determination on each virtual agent's suitability for handling the user requests at hand (e.g. some chatbots may respond with "I don't understand" or "I was not taught to handle that request"), the virtual agents may be grouped into different sets to better handle or serve future user or customer requests.

[1] For example, using automatic grammar or rule-based natural language generators The statistical grouping criteria above may include such techniques as using a classifier to estimate a probability that a virtual agent can handle a given request. In such a classifier, the input signals to the classifier may be the virtual agent's profiles, a user's or customer's profile, the semantic meaning of the user or customer request, and information from historical conversations (e.g., from conversation logs or transcripts).

Other further techniques that can be used for virtual agent selection includes (i) relevant request distribution and (ii) content-based bots ranking and selection. Each selection mode discussed above may be adaptively improved over time using machine learning techniques (e.g. supervised learning). Content-based bots ranking and selection techniques may include, for example, generating for each bot summaries, descriptions, topics, terminologies, or keywords about the kind of user utterances or requests the bot can handle. Improvement in handling future user requests may be achieved through more effective selection of bots using such additional content or meta-information.

The following procedure illustrates an example of the "relevant request distribution" approach:
  (a) build a database using training data that associates user requests with relevant virtual agents;
  (b) for each new user request:
    (i) find in the database k nearest "neighbors" (i.e., virtual agents who have handled similar past requests); and
    (ii) obtain a normalized relevant conversation distribution using statistics associated with the k neighbors to obtain a relevance metric for each potential virtual agent; and
  (c) selecting a desired number of federated conversational agents from the relevance metrics.

Machine learning methods may of course be used to adapt the selection process. Parameters for refinement under machine learning may include domain, security, brand, past user responses, semantics, named entity features, category features, past user satisfaction features, vertical intent features, temporal features, text similarity features, hit count features, and other relevant parameters.

In addition to basing on conversation context, the directory model may alternatively be based on content. As a configuration for deploying multiple virtual agents simultaneously to serve a user, federated conversational agents are limited by (i) scale, (ii) hidden bots (i.e., not all eligible virtual agents can be identified), (iii) stale information, (iv) network configuration (e.g., may be difficult in a network of short range, wireless devices), (v) need to protect personal information, and (vi) spamming and other undesirable conduct and incompatibility by non-cooperative virtual agents. Some of these disadvantages may be mitigated by other form of configuring the collaborative virtual agents.

Figure 5A:
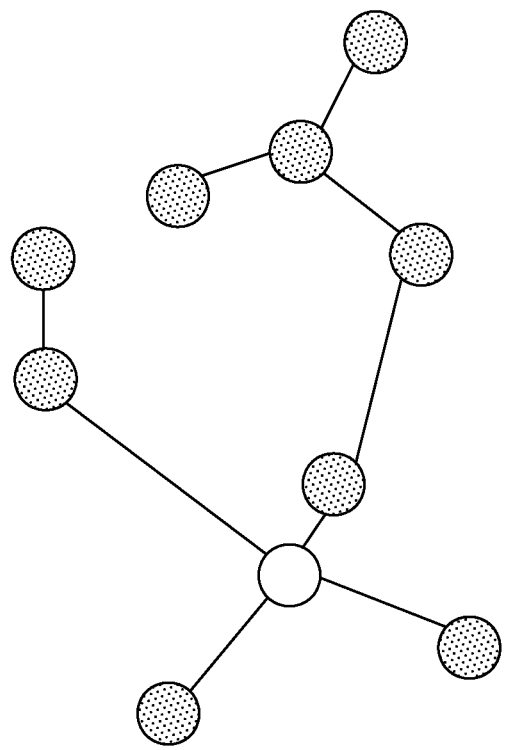
FIG. 5A illustrates one example of a message-passing network of decentralized conversational agents ("Pure P-2-P network").

For a message-passing configuration (e.g., the virtual agents are provided on a peer-to-peer network), each node of the network may be a client, a server, or both, serving as a decentralized conversational agent. One example of such a network of decentralized conversational agents is illustrated in FIG. 5A ("Pure P-2-P"). These decentralized communication agents may communicate, for example, using a flood algorithm, with a predetermined time-to-live to define search horizon. In such a network each decentralized conversational agent may decide whether or not to respond to an incoming request, according to its own on rule-based or learning-based model.

In the network of FIG. 5A, for example, connections between nodes are random, with each node having knowledge only of its neighboring nodes. Such a network does not scale well. One alternative to the Pure P-2-P network of FIG. 5A is a "Central-hub" network, which is illustrated in FIG. 5B. As shown in FIG. 5B, a Central-hub network includes a hub node (labeled 531 in FIG. 5B) to which user utterances are sent. Hub node 531 then routes user utterances to other decentralized conversational agents that can generate the desired responses. A Central-hub network is susceptible to an attack on the hub node.

Figure 5C:
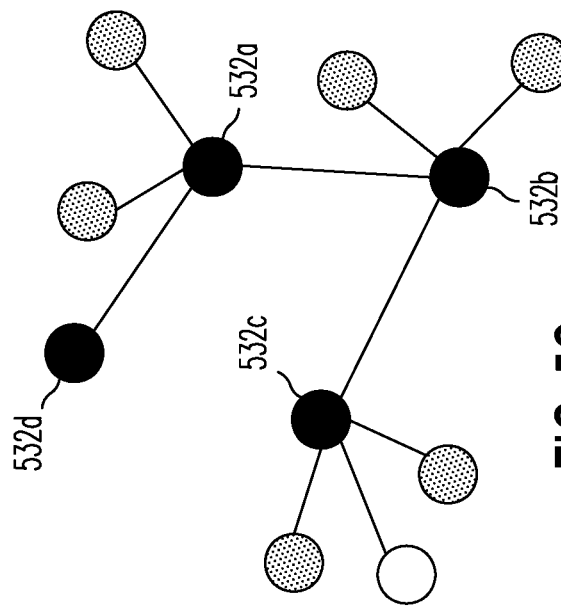
FIG. 5C illustrates a hierarchical or "super-peer" network, which is still another alternative to the Pure P-2-P and Central hub networks of FIGS. 5A and 5B.
Figure 5B:
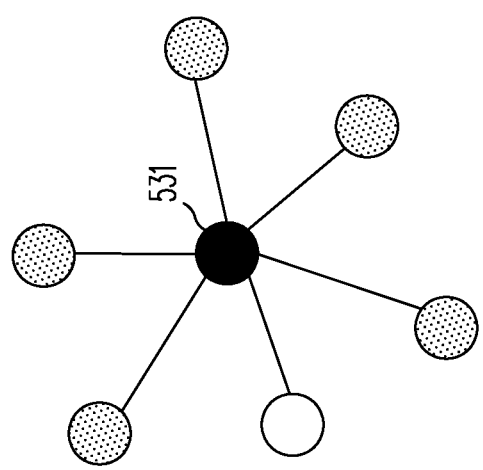
FIG. 5B illustrates a "central Hub network," which is an alternative to the Pure P-2-P network of FIG. 5A.

Still another alternative to the Pure P-2-P and Central hub networks is the hierarchical or "Super-peer" network, which is illustrated in FIG. 5C. In one embodiment, a super-peer network may include a two-level hierarchy of hub nodes and leaf nodes. (The hub nodes are labeled 532-*a*, 532-*b*, 532-*c* and 532*d* in FIG. 5C). In such a configuration, the leaf nodes are either clients or servers and are only connect to other leaf nodes through one or more hub nodes, which provide directory services to the leaf nodes. In the hierarchical network, flooding is inefficient communication protocol. Instead, rather than generating a profile for each leaf node, one may generate a profile for each neighborhood of leaf nodes (i.e., the collection of leaf nodes connected to a hub node). Such arrangement improve user utterance routing efficiency.

Other variations in the peer-to-peer architecture include (a) partial indexing over specific network resources; (b) structured peer-to-peer architecture using distributed hash tables, (iii) a peer-to-peer network implementing a gossip protocol, (iv) any architecture organized according to content or user interests; (v) a peer-to-peer network with super peers; and (vi) a peer-to-peer network implementing reputation management. These variations are known to those of ordinary skill in the art.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the present teachings as disclosed herein may be implemented as a firmware, firmware or software combination, firmware/hardware combination, or a hardware, firmware or software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A virtual agent system servicing a user request from a user, comprising:
   a conversational user interface receiving the user request and communicating with a plurality of virtual agents, wherein each virtual agent is associated with a profile created according to the virtual agent's content or service provided; and
   a dialog manager that directs operations of the conversational user interface, wherein the dialog manager, (i) receives the user request from the conversation user interface, (ii) causes the conversational user interface to select for collaboration a group of two or more virtual agents, based on an analysis of a context of the user request and the profile of each virtual agent selected, and to request and to receive a response to the user request from each of the virtual agents in the selected group, and (iii) integrates the received responses to the user request into an integrated response according to statistics specific to the virtual agents providing the received responses and causes the conversational user interface to provide the integrated response to the user.

2. The virtual agent system of claim I, wherein at least one of the virtual agents is tightly coupled to the dialog manager.

3. The virtual agent system of claim 1, further comprising an interactive design console and wherein the at least one of the virtual agents that is tightly coupled to the dialog manager is trained using the interactive design console.

4. The virtual agent system of claim 1, wherein at least one of the virtual agents is loosely-coupled to the dialog manager.

5. The virtual agent system of claim 4, wherein the at least one of the virtual agents is coupled to the dialog manager through one or more application programming interfaces.

6. The virtual agent system of claim 1, wherein the dialog manager comprises deep-learning models trained to perform the analysis of the user request.

7. The virtual agent system of claim 6, wherein the deep-learning models are trained through semi-supervised techniques.

8. The virtual agent system of claim 1, further comprising one or more of the following resources drawn on by the dialog manager: (a) a customer relationship database; (b) contact centers; and (c) additional virtual agents.

9. The virtual agent system of claim 1, wherein each virtual agent communicates with the interactive user interface over a protocol which specifies one or more of: the virtual agent's content, conversation format, and result statistics.

10. The virtual agent system of claim 1, wherein the virtual agents are selected by the user according to a browsing model.

11. The virtual agent system of claim 1, wherein the selected group of virtual agents are selected according to a directory model, based on recognizing the context of the user request.

12. The virtual agent system of claim 11, wherein the dialog manager generates a profile for each virtual agent, the profile comprising information or description regarding the content and services provided by the virtual agent.

13. The virtual agent system of claim 12, wherein the selected group of virtual agents are selected by evaluating and ranking the groups of virtual agent based, at least in part, on applying a predetermined set of metrics on the recognized context.

14. The virtual agent system of claim 13, wherein the metrics are recall-oriented.

15. The virtual agent system of claim 11 wherein, prior to grouping the virtual agents, the dialog manager causes the conversational user interface to send an initial request to a predetermined set of candidate virtual agents to solicit a potential response.

16. The virtual agent system of claim 15, wherein the dialog manager integrates the potential response using precision-oriented statistics.

17. The virtual agent system of claim 16, wherein the precision-oriented statistics comprise one or more of the following statistics: (a) inverse document frequencies, stop lists, historical requests, and context.

18. The virtual agent system of claim 15, further comprising a sample response database, wherein the dialog manager queries the sample response database with the initial request.

19. The virtual agent system of claim 1 wherein the virtual agents are grouped according to one or more of the following criteria: (i) conversation clustering; (ii) relevant conversation distribution; (iii) rule-based selection; (iv) conversation probing; and (v) statistical.

20. The virtual agent system of claim 1, wherein the virtual agents are grouped based on one or more of the following methods: (i) relevant request distribution and (ii) content-based bots ranking and selection.

21. The virtual agent system of claim 20, wherein the relevant request distribution method comprises:
(a) building a database using training data that associates user requests with relevant virtual agents;
(b) for each new user request:
(i) finding in the database k nearest "neighbors"; and
(ii) obtaining a normalized relevant conversation distribution using statistics associated with the k neighbors to obtain a relevance metric for each potential virtual agent; and
(c) selecting a desired number of federated conversational agents from the relevance metrics.

22. The virtual agent system of claim 1, wherein the machine learning methods are used to adapt parameters of the dialog manager, which includes one or more of: domain, security, brand, past user responses, semantics, named entity features, category features, past user satisfaction features, vertical intent features, temporal features, text similarity features, hit count features, and other relevant parameters.

23. The virtual agent system of claim 1, wherein the group of virtual agents are selected both according to the context and content the user request.

24. The virtual agent system of claim 1, wherein the virtual agents are grouped according to a message-passing model implemented in a peer-to-peer network.

25. The virtual agent system of claim 24, wherein each node of the peer-to-peer network comprises a client, a server, or both.

26. The virtual agent system of claim 24, wherein the peer-to-peer network implements a flood algorithm to distribute the user request to the virtual agents.

27. The virtual agent system of claim 26, wherein each virtual agent decides whether or not to respond to the user request.

28. The virtual agent system of claim 24, wherein the peer-to-peer network has a central-hub topology.

29. The virtual agent system of claim 24, wherein the peer-to-peer network has a hierarchical topology including hub nodes and leaf nodes.

30. The virtual agent system of claim 24, wherein the peer-to-peer network implements one or more of: (a) partial indexing over specific network resources; (b) structured peer-to-peer architecture using distributed hash tables, (iii) a gossip protocol, (iv) an architecture organized according to content or user interests; (v) super peers; and (vi) reputation management.

31. In a virtual agent system servicing a user request from a user, a method comprising:
in a conversational user interface, receiving the user request and communicating with a plurality of virtual agents, wherein each virtual agent is associated with a profile created according to the virtual agent's content or service provided; and
in a dialog manager that directs operations of the conversational user interface: (i) receiving the user request from the conversation user interface, (ii) causing the conversational user interface to select for collaboration a group of two or more virtual agents. based on an analysis of a context of the user request and the profile of each virtual agent selected, and to request and to receive a response to the user request from each of the virtual agents in the selected group, and (iii) integrating the received responses to the user request into an integrated response according to statistics specific to the virtual agents providing the received responses and causes the conversational user interface to provide the integrated response to the user.

32. The method of claim 31, wherein at east one of the virtual agents is tightly coupled to the dialog manager.

33. The method of claim 31, further comprising providing an interactive design console and training the at least one of the virtual agents that is tightly coupled to the dialog manager using the interactive design console.

34. The method of claim 31, wherein at least one of the virtual agents is loosely-coupled to the dialog manager.

35. The method of claim 34, wherein the at least one of the virtual agents is coupled to the dialog manager through one or more application programming interfaces.

36. The method of claim 31, wherein the dialog manager comprises deep-learning models trained to perform the analysis of the user request.

37. The method of claim 36, further comprising training the deep-learning models using semi-supervised techniques.

38. The method of claim 31, further comprising drawing on one or more of the following resources: (a) a customer relationship database; (b) contact centers; and (c) additional virtual agents.

39. The method of claim 31, wherein each virtual agent communicates with the interactive user interface over a protocol which specifies one or more of: the virtual agent's content, conversation format, and result statistics.

40. The method of claim 31, wherein the virtual agents are selected by the user according to a browsing model.

41. The method of claim 31, wherein the group of selected virtual agents is selected according to a directory model, based on recognizing the context of the user request.

42. The method of claim 41, further comprising the dialog manager generating a profile for each virtual agent, the profile comprising information or description regarding the content and services provided by the virtual agent.

43. The method of claim 42, wherein the selected group of virtual agents is selected by evaluating and ranking the virtual agent based, at least in part, on applying a predetermined set of metrics on the recognized context.

44. The method of claim 43, wherein the metrics are recall-oriented.

45. The method of claim 41 further comprising, prior to selecting the virtual agents, the dialog manager causing the conversational user interface to send an initial request to a predetermined set of candidate virtual agents to solicit a potential response.

46. The method of claim 45, further comprising the dialog manager integrating the potential response using precision-oriented statistics.

47. The method of claim 46, wherein the precision-oriented statistics comprise one or more of the following statistics: (a) inverse document frequencies, stop lists, historical requests, and context.

48. The method of claim 45, further comprising providing a sample response database, wherein the dialog manager queries the sample response database with the initial request.

49. The method of claim 31, further comprising grouping the virtual agents according to one or more of the following criteria: (i) conversation clustering; (ii) relevant conversation distribution; (iii) rule-based selection; (iv) conversation probing; and statistical.

50. The method of claim 31, further comprising grouping the virtual agents based on one or more of the following methods: (i) relevant request distribution and (ii) content-based hots ranking and selection.

51. The method of claim 50, wherein the relevant request distribution method comprises:
(a) building a database using training data associates user requests with relevant virtual agents;
(b) for each new user request:
(i) finding in the database k nearest "neighbors"; and
(ii) obtaining a normalized relevant conversation distribution using statistics associated with the k neighbors to obtain a relevance metric for each potential virtual agent; and
(c) selecting a desired number of federated conversational agents from the relevance metrics.

52. The method of claim 31, wherein the machine learning methods are used to adapt parameters of the dialog manager, which includes one or more of: domain, security, brand, past user responses, semantics, named entity features, category features, past user satisfaction features, vertical intent features, temporal features, text similarity features, hit count features, and other relevant parameters.

53. The method of claim 31, further comprising selecting the group of virtual agents both according to the context and content of the user request.

54. The method of claim 31, wherein the virtual agents are organized according to a message-passing model implemented in a peer-to-peer network.

55. The method of claim 54, wherein each node of the peer-to-peer network comprises a client, a server, or both.

56. The method of claim 54, wherein the peer-to-peer network implements a flood algorithm to distribute the user request to the virtual agents.

57. The method of claim 56, wherein each virtual agent decides whether or not to respond to the user request.

58. The method of claim 54, wherein the peer-to-peer network has a central-hub topology.

59. The method of claim 54, wherein the peer-to-peer network has a hierarchical topology including hub nodes and leaf nodes.

60. The method of claim 54, wherein the peer-to-peer network implements one or more of: (a) partial indexing over specific network resources; (b) structured peer-to-peer architecture using distributed hash tables, (iii) a gossip protocol, (iv) an architecture organized according to content or user interests; (v) super peers; and (vi) reputation management.

* * * * *